(12) United States Patent
Leung et al.

(10) Patent No.: US 8,385,942 B1
(45) Date of Patent: Feb. 26, 2013

(54) END-USER INTERACTION FRAMEWORK

(75) Inventors: Edmond Leung, Cupertino, CA (US); Andrew Coward, Saratoga, CA (US)

(73) Assignee: Carrier IQ, Inc., Sunnyvale, CA (US)

( * ) Notice: Subject to any disclaimer, the term of this patent is extended or adjusted under 35 U.S.C. 154(b) by 0 days.

(21) Appl. No.: 13/463,030

(22) Filed: May 3, 2012

(51) Int. Cl.
*H04Q 7/20* (2006.01)
(52) U.S. Cl. ............... 455/456.1; 455/419; 455/418; 455/423
(58) Field of Classification Search ............ 455/419, 455/418, 423, 456.1
See application file for complete search history.

(56) References Cited

U.S. PATENT DOCUMENTS

| | | | |
|---|---|---|---|
| 2006/0217116 A1* | 9/2006 | Cassett et al. | 455/423 |
| 2006/0223503 A1* | 10/2006 | Muhonen et al. | 455/414.1 |
| 2008/0051062 A1* | 2/2008 | Lee | 455/411 |
| 2008/0119131 A1* | 5/2008 | Rao | 455/3.04 |

* cited by examiner

*Primary Examiner* — Kwasi Karikari
(74) *Attorney, Agent, or Firm* — Patentry

(57) ABSTRACT

A method operable at a device to trigger on observable events, to evaluate a process, to present a flow to an end-user, to record the end-user's responses, and transmit the responses to a server. A Resident Intelligence serves all of the instances of end-user interface clients with Decision Logic. Decision Logic determines when data should be transmitted, which flows to launch to capture data, and evaluates conditions under which flow should be launched. Based on the results of the end-user interaction replies, data collection profiles are enabled, disabled, or modified.

17 Claims, 1 Drawing Sheet

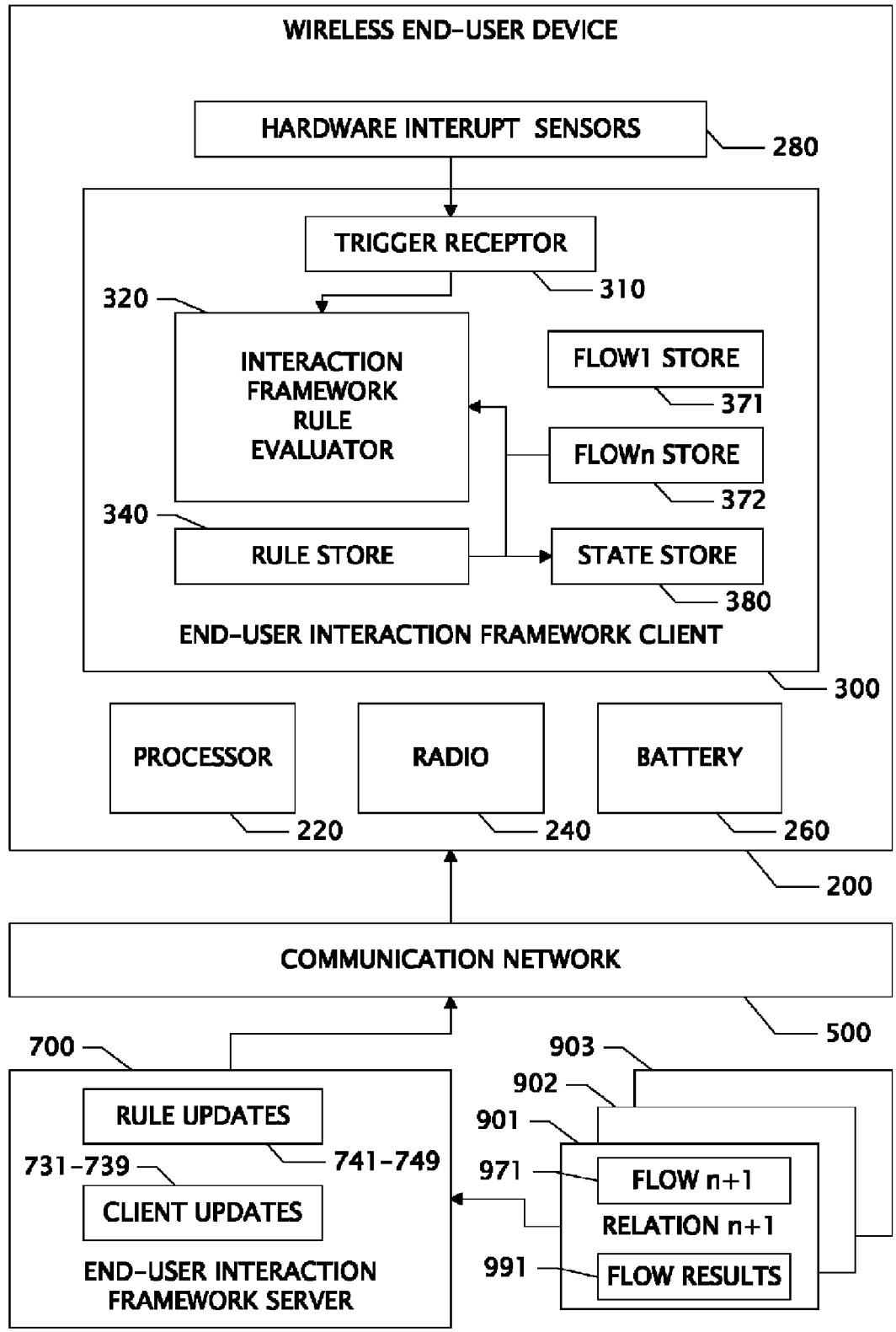

END-USER INTERACTION FRAMEWORK

CROSS REFERENCE TO RELATED APPLICATIONS

None

FIELD OF THE INVENTION

The present invention relates to wireless communication networks and related systems and devices. More specifically, embodiments of the present invention relate to systems and methods for providing interaction between end-users of a device and potential recipients of data related to the end-user or to the device.

BACKGROUND

As communication standards converge, it may be desirable that a wireless device be designed and manufactured for a global market and have compatibility with many communication carriers, many go-to-market channels, and be agile in both protocols and geography. Because the intellectual property within and affecting the operation of a wireless device will be multi-sourced, it may be advantageous for the end-user to build a relationship with each supplier of a component of the device as received, as well as with potential new suppliers of enhancements that are desired after its final sale. In addition, a wireless device may be used by persons other than its purchaser/licensee and in jurisdictions other than where it was first sold. As time goes on, regulatory environments change either dynamically around our original location, or according to our whims in travel or employment. Crossing a border, or a dateline may require changes in privacy or intellectual property (ip) end-user license agreements. Those providers of intellectual property or services, and potential clients for information generated or entered via wireless device also desire a flexible, efficient, and uniform way to strengthen and improve their relationship with mobile users.

Thus it can be appreciated that what is needed is an improved method and system to enable end-users to review and accept modified or new relationships with existing or desired partners who may provide products and services or enforce terms and conditions. The end-users may also choose to renew, terminate, or modify data sharing agreements with each one of a plurality of different relations. Each of a plurality of end-users of one wireless device may choose differently. Most importantly, an end-user may desire to optionally change his choice according to his need or reward for sharing personal data, opinions, information, or measurements without complexity.

SUMMARY OF THE INVENTION

A method for providing an end-user interaction framework begins with triggering an evaluation process. The most basic trigger is an observable event in recent history. Each trigger starts an evaluation process which determines whether or not to invoke a flow. A method operates at a server to receive location information from a mobile wireless device and return a dynamically adapted flow to be manifested to an end-user and to receive each end-user's agreement/rejection and other responses to the flow.

Configuring a mobile device with a new subscriber number or id or software/firmware release are likely exemplary triggers. Power cycling the device or passing a threshold in abnormal terminations of calls, connections, or applications are also likely exemplary triggers. Within this patent application, a trigger is defined as an event, such as an observable change in a state or a discontinuity. An evaluation process is defined as storing and/or retrieving data which may include state and multiple events or conditions, as well as events and conditions distributed over time. An evaluation process, upon being triggered, may combine logic over a plurality of variables, compare values with thresholds, count instances up or down to a integer, and acquire information from the end-user or the environment outside of the device. Evaluation processes may have Boolean operations, if-then-else executable commands, increment or decrement a counter, compare two variables for greater than, equal, or less than conditions, and end-user true or pseudo-random number generators, e.g. to encrypt or to avoid congestion.

In an improved embodiment of the invention the method further obtains location information of the wireless device. By transmitting a geographical location, such as global positioning system (gps) coordinates, the wireless device may obtain dynamically generated or context sensitive content from the server which is indicia of a language and legal jurisdiction within which the device is operable. In an embodiment, the method obtains dynamically configured flows according to the end-user id, the software, firmware, and hardware configuration of the device, or the network to which it is connected.

In an other improved embodiment of the invention, additional triggers may be received from the end-user himself by navigating through the menu and application icons on display as well as received from the server. A change in privacy policy, regulatory requirements, or customer service support level may be reasons that a flow should be revisited, reevaluated, and its acceptance renewed. An end-user may conveniently change his mind about sharing more or less or specifically which information that he agrees to share with any one relation and terms and conditions in changes to the device, end-user, or regulatory requirement may cause a change or reconfirmation.

In general, flows present information to the end-user of the device and receive, store, and transmit the end-user's response to forms or input selections. The invention is distinguished by the ability to change the flows after the product has left its manufacturer, seller, or integrator and reflect after sale changes in software, end-users, and regulatory environment, e.g. new laws or change in jurisdiction or both.

DETAILED DISCLOSURE OF EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

FIG. 1 is a block diagram of an exemplary system embodiment of the invention. A plurality of wireless end-user devices 200 is communicatively coupled to a communications network 500. Said communications network is further coupled to an end-user interaction framework server 700.

The end-user interaction framework server is comprised of a rule update store which can be accessed to provide rule updates 741-749. The end-user interaction framework server is further comprised of a client update store which can be accessed to provide client updates 731-739. Client updates may include flows received from a plurality of relation partners 901-903. Each of the relation partners desires to receive flow results 991-993 from each of a plurality of wireless end-users. Each of the relation partners provides at least one flow 971-973 defined elsewhere in this application to the end-user interaction framework server.

A wireless end-user device 200 is comprised of hardware and software. Conventional hardware components include a processor 220, a radio 240, a battery 200, and hardware interrupt sensors 280 which are conventionally interconnected (known to those skilled in the art and not shown to improve comprehension). A Resident Intelligence serves at least one end-user interaction framework client 300 which is a software component which further configures the processor and memory of the wireless end-user device to perform the following functions. It is understood that memory and processor can be configured to perform the functions of circuits. A trigger receptor 310 is coupled to Decision Logic within an interaction framework rule evaluator 320. Decision Logic evaluates rules when a trigger is received to minimize consumption of battery and processor resources. The interaction framework rule evaluator is coupled to a rule store 340, a state store 380, and a plurality of flow stores 371-372. The rule store may be updated from the end-user interaction framework server to select one or more flows upon reading and writing to state store and evaluating rules. When one or more flows are selected, the Resident Intelligence manifests the flow to an end-user, receives any response from the end-user, and transmits flow results to the relation partner.

One aspect of the present invention is a method for operation of a wireless end-user device comprising:
  triggering a rule evaluation process on at least one detectable event in the recent past,
  evaluating at least one rule on configuration, conditions, environment or history of the end-user device, and
  either operating a flow or not operating a flow as a result of the evaluation. An evaluation is distinguished from a trigger by having multiple variables which may be operated on with mathematical transformations, Boolean logic, compared with thresholds, or include previously stored state information. E.g. is this the 3rd, 5th, 7th, or 11th time the trigger has occurred? Has the trigger occurred t times in the last s seconds? To conserve wireless end-user device battery, the evaluation is not a continuously operating daemon, but is started by a trigger and terminates as soon as possible.

In an embodiment, the method further comprises
transmitting location information of the end-user device obtained from a wireless base station,
receiving a flow from an end-user interaction server in response to the transmitted location information and the evaluation of flow rules, and
manifesting the flow on a display to a end-user and receiving the end-user's reply. E.g. if in Quebec (area code=514), obtain a flow en Francais.

In an embodiment a flow is presentation of information to an end-user and reception of indicia from the end-user in response to the information.

In an embodiment location information is a geobin.
In an embodiment location information is a cellular base station.
In an embodiment location information is a global positioning system coordinate.
In an embodiment a detectable event is a dropped call.
In an embodiment a detectable event is a power-on cycle.
In an embodiment a rule concerns a change of end-user identity.
In an embodiment a rule concerns a change of jurisdiction.

In an embodiment a rule concerns a change of a phone number.

In an embodiment the method further comprises storing the end-user's reply and transmitting the result of the flow to an end-user interaction framework server.

In an embodiment the method further comprises receiving a command initiated from an end-user interaction framework server to operate a flow.

In an embodiment the method further comprises receiving a command from the end-user to operate a flow.

In an embodiment the method further comprises receiving a plurality of flows from an end-user interaction framework server,
  referring to a priority list of which flow to operate before a second flow,
  storing data received in a first flow and in a second flow,
  transmitting data stored in a first flow to a first destination, and
  transmitting data stored in a second flow to a second destination.

In an embodiment, each end-user interaction framework client supports a plurality of flows visible only to a single end-user according to a customer ID. In an embodiment a flow comprises an end-user license agreement and an end-user response comprises one of accept, reject, and later. In an embodiment a flow comprises an invitation to enroll as a survey participant and a end-user response comprises one of accept, decline, and later.

In an embodiment, a flow comprises a data privacy agreement and a end-user response comprises one of agree to terms and reject the terms.

In an embodiment the method further comprises
  operating a flow after an initial operation of the flow,
  receiving an end-user's revised responses,
  storing the revised responses, and
  notifying an end-user interaction server of the revised responses.

A useful embodiment of the invention is in improving the privacy of mobile device end-users. Such an embodiment has some of the following aspects of the invention:
  a. An exemplary method provides an end-user interface client in an end-user device by:
  b. sensing a trigger,
  c. executing decision logic;
  d. launching an end-user interaction flow;
  e. presenting a plurality of end-user interface contents;
  f. escaping;
  g. presenting end-user input interfaces;
  h. receiving end-user inputs; and
  i. storing and transmitting the result.

An exemplary evaluation includes evaluating a boolean combination of roaming status, customer ID, completion validity period of each flow; date, and time.

One useful flow could result from evaluating that a call dropped in the previous hour. In an example, the result of the flow comprises:
  a. encrypting and storing the data into local storage on the end-user device, and
  b. on the condition that the device is not roaming and connectivity is available, transmitting the data to the server.

To conserve resources on the device, a flow can then
  a. delete the data from the local store of the end-user device.

An aspect of executing a flow at the end-user device is evaluation of transmission logic and when the transmission logic evaluates as true, a. transmitting data to the server according to the logic combination.
b. Non-limiting exemplary outcomes determined by evaluation of the transmission logic include without restriction to the following:
c. randomizing transmission times to prevent collision,
d. scheduling by date and time,
e. determining status of roaming or not roaming,
f. determining availability of transmission channels,
g. selection of preferred transmission channel among available transmission channels, and
h. encrypting the data prior to transmission.

At an end-user interaction framework server, an aspect of the invention is
a. receiving from a plurality of devices the results of client operation of flows at each device,
b. storing the results of client operation of flows at each device, and
c. retrieving and transmitting to parties authorized by the flows the results of client operation of flows at each device.

After receiving the result of a flow, the end-user interaction framework server has sufficient information to
a. determine if there is a selection among or within a profile for data collection and/or
b. transmit a properly configured profile to the device according to the results of the flow operating at a end-user device.
c. In a preferred embodiment, each user of a multi-user device interacts with an end-user interface client visible only to him. The end-user interface client contains one or more flows which present information and record and transmit the results of the flow.

Upon receiving a command at an end-user interaction framework server one aspect of the invention enables cancellation of a flow and removing all content from the device without transmission.

The method of the invention provides for operating at least one of an end-user interaction framework client at an end-user operable device comprising:
a. manifesting the presentation of a flow to an end-user and
b. capturing the end-user's inputs, selections, and navigation.

In an embodiment, a plurality of end-user interaction framework clients co-exist on an end-user operable device. One aspect of the invention is to enable each end-user interaction framework client to support a plurality of flows visible to only the customer ID of the end-user.

Operating the method of the invention at an end-user interaction framework server provides an opportunity to re-engage an end-user post initial sale by:
a. receiving a command to launch an Opt-in/Opt-out flow at a selected client,
b. transmitting an SMS or WAP push command to a client to launch a particular Opt-in/Opt-out flow, and
c. receiving the end-user's selection of Opt-in/Opt-out.

Other server operations, which support the end-user interaction framework include:
a. configuring decision logic,
b. configuring flow content,
c. specifying profile mapping as a consequence of end-user responses to flow content, and
d. determining to store indefinitely or delete after successful retrieval by the relation.

When an end-user requires support but has not previously consented to record and transmit data, a remote support representative may restart a flow and guide the user to revise his replies suitable for problem resolution. At any time the end-user may reject all previous setting and delete the data stored in the end-user device up to that time but not yet transmitted.

A flow within this patent application is a sequence of user interactions. A flow is a process comprising displaying information or a form to a user on a wireless device, receiving selections, or inputs, and recording the result. A resident intelligence operates a flow which may be selected by decision logic. One or more flows may be launched after evaluating decision logic. The decision logic is not constantly being evaluated. A trigger causes decision logic to be evaluated.

CONCLUSION

As indicated herein, embodiments of the present invention may be implemented in connection with a special purpose or general purpose telecommunications device, including wireless and wireline telephones, other wireless communication devices, or special purpose or general purpose computers that are adapted to have comparable telecommunications capabilities. Embodiments within the scope of the present invention also include computer-readable media for carrying or having computer-executable instructions or electronic content structures stored thereon, and these terms are defined to extend to any such media or instructions that are used with telecommunications devices.

One beneficial transformation of the invention supports assisting an end-user who has confused himself or the client operating on a device, by providing a command at the server which enables clearing the completion status of a customer ID of a flow on a particular device, reversing the Opt-in selection of the end-user, or re-launching a particular flow on demand. Note that the actual decision is left to the end-user after error removal or re-navigation has been provided.

By way of example such non-transitory computer-readable media can comprise RAM, ROM, flash memory, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

One useful application of the subject matter, which should not constrain the breadth of the invention, is that of enabling opt-in opt-out of data collection by at least one end-user or at least one application. End-users may choose which surveys they wish to participate in and the degree of information that they wish to share and at any point modify their agreement unilaterally. End-users may have stronger affiliation with one supplier vendor than to another and these loyalties may shift over the life of a product. Corporations may change ownership and their policies. Governments may change regulatory climates. End-users may transit from one jurisdiction to another. The present invention supports dynamic relations. The present invention can be easily distinguished from one-time acceptance of terms and conditions which cannot subsequently be easily modified either loosened or tightened. For example, if business needs, technology, or regulation change, conventional solutions cannot inform or obtain agreement from end-users.

The present invention is easily distinguished from installation scripts and click-wrap end-user license agreements by mapping to one or more profiles for data collection based on an end-user's concurrence. The end-user's inputs may be changed according to preferences or perceived value and the reassertion/re-ratification/editing of permissions may be time based, event based, or even jurisdiction based. Furthermore each user of an end-user device may make a different decision without binding all other co-users. Furthermore data permitted for one party may be denied to a second party. At any time the end-user may revise his user input for any one or all of the data collection profiles. In contrast, a typical end-user license agreement forces a binary choice to agree to all terms and conditions or to return the product for a refund. In contrast a typical warranty registration delivers little except unsolicited marketing spam. The invention is easily distinguished from individual End-user License Agreements for every software application. The invention is easily distinguished from individual installation scripts for every software application. The invention provides on behalf of a plurality of client companies, a unified opt-in vehicle to enable or disable data collection. In contrast to a simple control panel which offers many on-off switches, the invention informs the end-user of tradeoffs and dependencies by providing a flow and handling complex dependencies without burdening a user.

We claim:

1. A method for operation of a end-user device comprising:
   triggering a rule evaluation process on at least one detectable event in the recent past,
   evaluating at least one rule on configuration, conditions, environment or history of the end-user device,
      transmitting location information of the end-user device,
      receiving a plurality of flows from at least one end-user interaction server in response to the transmitted location information and the evaluation of flow rules,
      referring to a priority list of which of the plurality of flows to operate first,
   either operating a flow or not operating a flow as a result of the evaluation;
   manifesting at least one flow on a display to an end-user,
   receiving a reply from the end-user, and
   storing data received in a first flow and in a second flow,
   transmitting data stored in at least one flow to at least one destination;
   operating a flow after an initial operation of the flow,
   receiving an end-user's revised responses,
   storing the revised responses, and
   notifying an end-user interaction server of the revised responses.

2. The method of claim 1 further comprising:
   transmitting data stored in a first flow to a first destination, and
   transmitting data stored in a second flow to a second destination.

3. The method of claim 2 wherein a flow is presentation of information to an end-user and reception of indicia from the end-user in response to the information.

4. The method of claim 2 wherein location information is a cellular base station.

5. The method of claim 2 wherein location information is a global positioning system coordinate.

6. The method of claim 2 wherein a detectable event is a dropped call.

7. The method of claim 2 wherein a detectable event is a power-on cycle.

8. The method of claim 2 wherein a rule concerns a change of subscriber identity encoded within a subscriber identity module.

9. The method of claim 2 wherein a rule concerns a change of jurisdiction.

10. The method of claim 2 wherein a rule concerns a change of a phone number.

11. The method of claim 2 further comprising receiving a command initiated from a server to operate a flow.

12. The method of claim 2 further comprising receiving a command from the end-user to operate a flow.

13. The method of claim 2 wherein each end-user interaction client supports a plurality of flows visible only to a single end-user according to a customer ID.

14. The method of claim 3 wherein a flow comprises an end-user license agreement and an end-user response comprises one of accept, reject, and later.

15. The method of claim 3 wherein a flow comprises an invitation to enroll as a participant and an end-user response comprises at least one of accept, decline, and later.

16. The method of claim 3 wherein a flow comprises an invitation to join a survey and an end-user response comprises at least one of accept, decline, and later.

17. The method of claim 3 wherein a flow comprising a data privacy agreement and an end-user response comprises one of agree to terms and reject the terms.

* * * * *